United States Patent [19]

Ohshima

[11] Patent Number: 5,483,368
[45] Date of Patent: Jan. 9, 1996

[54] OPTICAL COMMUNICATION SYSTEM SUITABLE FOR SELECTIVE RECEPTION OF MULTIPLE SERVICES

[75] Inventor: Shigeru Ohshima, Kanagawa, Japan

[73] Assignee: Kabushiki Kaisha Toshiba, Kawasaki, Japan

[21] Appl. No.: 978,496

[22] Filed: Nov. 18, 1992

[51] Int. Cl.$^6$ .............................. H04J 14/02; H04B 10/06
[52] U.S. Cl. .......................... 359/124; 359/133; 359/161; 359/181; 359/189; 359/191
[58] Field of Search .................................. 359/123, 124, 359/125, 120, 115, 173, 189, 191, 133, 181, 161, 157, 190

[56] References Cited

U.S. PATENT DOCUMENTS

| | | | |
|---|---|---|---|
| 4,754,452 | 6/1988 | Henry | 359/125 |
| 5,189,542 | 2/1993 | Oudar | 359/128 |
| 5,202,782 | 4/1993 | Nakamura et al. | 359/152 |
| 5,245,459 | 9/1993 | Faulkner et al. | 357/125 |
| 5,253,309 | 10/1993 | Nazarathy et al. | 385/4 |

OTHER PUBLICATIONS

Glance, et al., Electronics Letters, vol. 23, No. 17, Aug. 13, 1987, pp. 875–876, "Densely Spaced WDM Coherent Optical Star Network".

Lipscomb, et al., Electronics Letters, vol. 19, No. 8, Apr. 14, 1983, pp. 277–278, "Long–wavelength Single–mode WDM for CATV Applications".
Chaffaut, et al., IEEE Global Telecommunications Conference & Exhibition '90, 303.2, pp. 120–124, "An ATM cell based transmission system on a pon structure".
Conference: ICC '80, 1980, Seattle, Wash., USA, all.

*Primary Examiner*—Leslie Pascal
*Attorney, Agent, or Firm*—Oblon, Spivak, McClelland, Maier & Neustadt

[57] ABSTRACT

An optical communication system suitable for selective reception of multiple services, which facilitates the adaptation of the already existing service network to an expansion of the service of the system by incorporating additional services, inexpensively, without causing the inconvenience to the subscribers of the system. In the system, the intensity modulated light signals with a first wavelength and the angle modulated light signals with a second wavelength are transmitted through the optical fiber communication lines in a form of multiplexed light signals. Then, the intensity modulated light signals in the multiplexed light signals are received and demodulated by using a direct detection, while the angle modulated light signals in the multiplexed light signals transmitted are received and demodulated from the multiplexed light signals. The selective detection of the angle modulated light signals is preferably made by a balanced optical heterodyne/homodyne receiver.

19 Claims, 12 Drawing Sheets

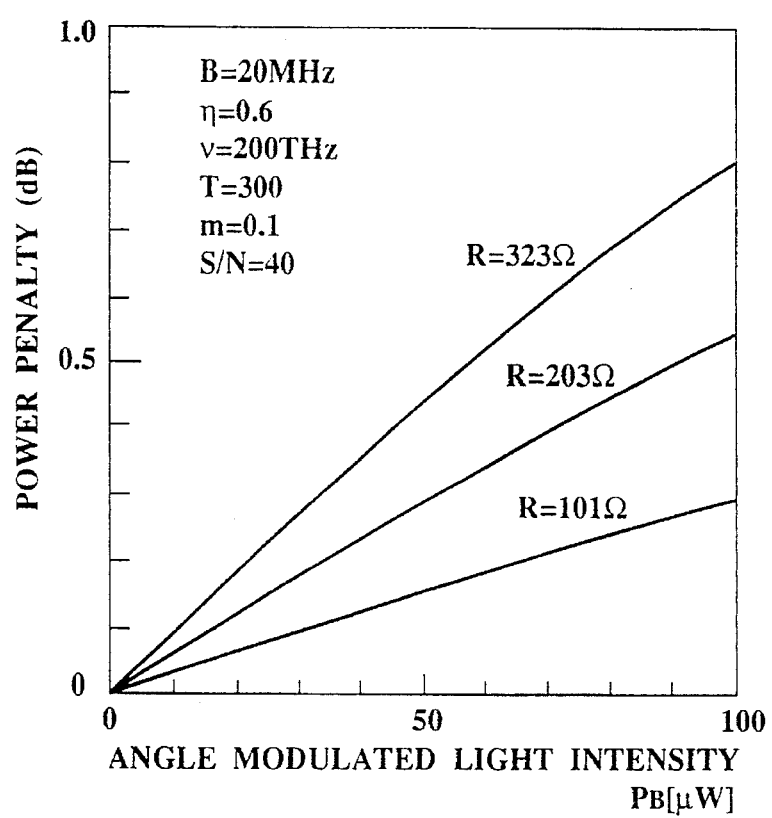
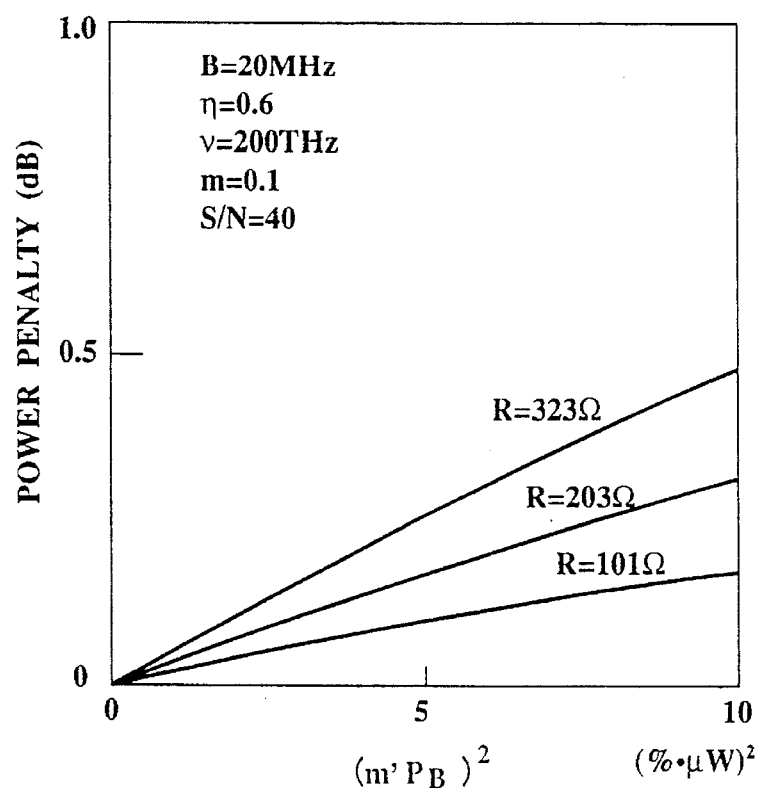

OPTICAL COMMUNICATION SYSTEM SUITABLE FOR SELECTIVE RECEPTION OF MULTIPLE SERVICES

BACKGROUND OF THE INVENTION

1. Field of the Invention

The present invention relates to an optical communication system to be utilized in a subscriber communication network.

2. Description of the Background Art

A conventional optical subscriber communication system for providing one service has a typical configuration as shown in FIG. 1A.

In this configuration, a system station side has an optical transmitter 1 of an intensity modulation type which transmits the intensity modulated light signals containing the data to be supplied to the subscribers of the system, with the wavelength of λ1, through an optical fiber 2 to an optical star coupler 3. These intensity modulated light signals are then distributed by the optical star coupler to optical fibers 4, 5, and 6 connected to the subscriber terminals equipped with optical receivers 7, 8, and 9 of a direct detection type which are capable of receiving the intensity modulated light signals with the wavelength λ1. This type of a subscriber communication system can be utilized as a cable TV network system, for example.

Now, consider a case of expanding the service of the system by additionally providing the second service different from the first service provided between the optical transmitter 1 and the optical receivers 7, 8, and 9, in parallel to the first service, only to those subscribers of the first service who also subscribed to the second service as well. Conventionally, there are two types of modification of the configuration of FIG. 1A for adapting the system to such a case. In the following, those elements which are substantially equivalent to those in the configuration of FIG. 1A will be given the same reference numerals in the drawings and their description will be omitted.

One type of modification is to modify the configuration of FIG. 1A to that shown in FIG. 1B, which utilizes the wavelength division multiplexing transmission mode.

Namely, in the configuration shown in FIG. 1B, the system station side further includes a second service optical transmitter 10 of an intensity modulation type which transmits the intensity modulated light signals containing the data of the second service, with the wavelength of λ2 different from the wavelength λ1 of the light signals of the first service. In this case, the light signals of the first service transmitted from the first service optical transmitter 1 and the light signals of the second service transmitted from the second service optical transmitter 10 are multiplexed by an optical wavelength division multiplexer 11 and the multiplexed light signals obtained at the optical wavelength division multiplexer 11 are transmitted through the optical fiber 2 and distributed by the optical star coupler 3 to the optical fibers 4, 5, and 6.

In addition, in this case, the subscriber terminals are also equipped with optical wavelength division demultiplexer 12, 13, and 14 attached on the optical fibers 4, 5, and 6 in front of the first service optical receivers 7, 8 and 9, respectively, which are capable of demultiplexing the light signals of the first service with the wavelength λ1 and the light signals of the second service with the wavelength λ2.

Furthermore, the subscriber terminal of a subscriber who also subscribed to the second service is also equipped with a second service optical receiver 15 of a direct detection type which is capable of receiving the intensity modulated light signals with the wavelength λ2, which receives the light signals of the second service demultiplexed from the light signals of the first service at the optical wavelength division demultiplexer 14.

In this type of modification, it is necessary to provide the optical wavelength division demultiplexers to all the subscriber terminals including the subscriber terminals of those subscribers who do not subscribe to the second service. Consequently, when this type of modification is adopted, the addition of the second service will require the change of the subscriber terminal equipment to those subscribers who do not subscribe to the second service as well, so that this type of modification can be quite inconvenient for a large number of the subscribers of the system.

Another type of modification is to modify the configuration of FIG. 1A to that shown in FIG. 1C, which utilizes an additional optical fiber 17 dedicated to the second service. In this case, the second service optical transmitter 10 at the system station side is directly connected with a separate second service optical receiver 16 additionally provided to the subscriber who subscribe to the second service in addition to the first service through this additional optical fiber 17, independently from the optical fiber network for the first service. Here, in this case, the light signals of the second service may have the same wavelength λ1 as the light signals of the first service, as they are not going to be multiplexed. Also, in this case, when a number of subscribers who subscribe to the second service increases, the distribution of the light signals of the second service using the optical star coupler will be necessary, just as in the optical fiber network for the first service shown in FIG. 1A.

In this type of modification, the already existing optical fiber network for the first service cannot be utilized at all for the additional second service and it is necessary to provide a completely new optical fiber network dedicated to the second service, so that this type of modification can be quite expensive and highly ineconomical.

SUMMARY OF THE INVENTION

It is therefore an object of the present invention to provide an optical communication system suitable for selective reception of multiple services, which facilitates the adaptation of the already existing service network to an expansion of the service of the system by incorporating additional services, inexpensively, without causing the inconvenience to the subscribers of the system.

According to one aspect of the present invention there is provided an optical communication system, comprising: optical fiber communication lines; first optical transmitter means of an intensity modulation type for transmitting intensity modulated light signals with a first wavelength through the optical fiber communication lines; second optical transmitter means of an angle modulation type for transmitting angle modulated light signals with a second wavelength through the optical fiber communication lines in a form of multiplexed light signals multiplexing the intensity modulated light signals and the angle modulated light signals; first optical receiver means of a direct detection type for receiving the multiplexed light signals through the optical fiber communication lines and demodulating the intensity modulated light signals from the multiplexed light signals; and second optical receiver means for receiving and demodulating the angle modulated light signals from the multiplexed light signals transmitted through the optical fiber communication lines.

According to another aspect of the present invention there is provided an optical communication method, comprising the steps of: transmitting intensity modulated light signals with a first wavelength through optical fiber communication lines; transmitting angle modulated light signals with a second wavelength through the optical fiber communication lines in a form of multiplexed light signals multiplexing the angle modulated light signals and the intensity modulated light signals; receiving the multiplexed light signals transmitted through the optical fiber communication lines and demodulating the intensity modulated light signals from the multiplexed light signals by using a direct detection; and receiving and demodulating the angle modulated light signals from the multiplexed light signals transmitted through the optical fiber communication lines.

Other features and advantages of the present invention will become apparent from the following description taken in conjunction with the accompanying drawings.

BRIEF DESCRIPTION OF THE DRAWINGS

FIG. 4 is a graph showing a power penalty on intensity modulated light signals as a function of a light intensity of angle modulated light signals in the optical communication system of FIG. 2.

FIG. 5 is a graph showing a power penalty on intensity modulated light signals as a function of an intensity modulation factor of angle modulated light signals in the optical communication system of FIG. 2.

DETAILED DESCRIPTION OF THE PREFERRED EMBODIMENTS

Figure 1A:
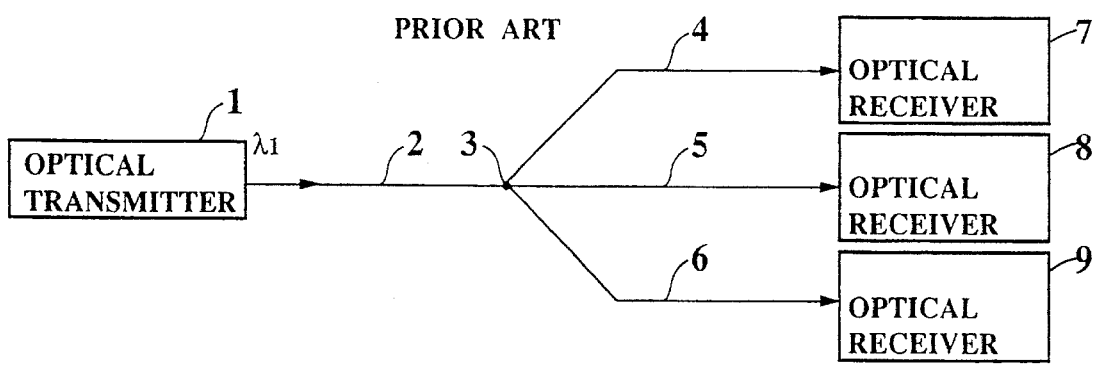
FIG. 1A is a schematic diagram of an exemplary configuration of a conventional optical subscriber communication system.
Figure 1B:
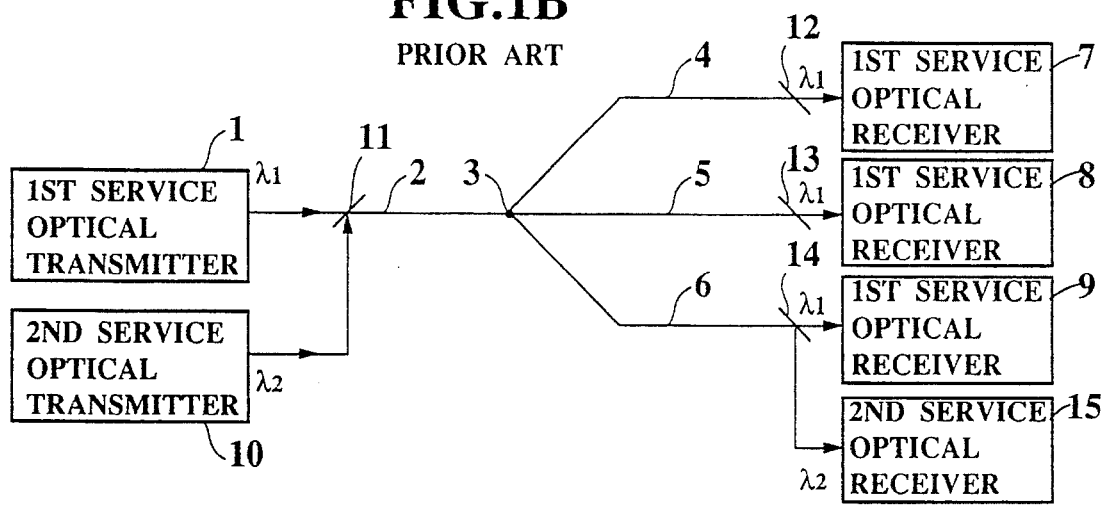
FIG. 1B is a schematic diagram of one conventionally known type of modification of the configuration of FIG. 1A in a case of incorporating an additional service.
Figure 1C:
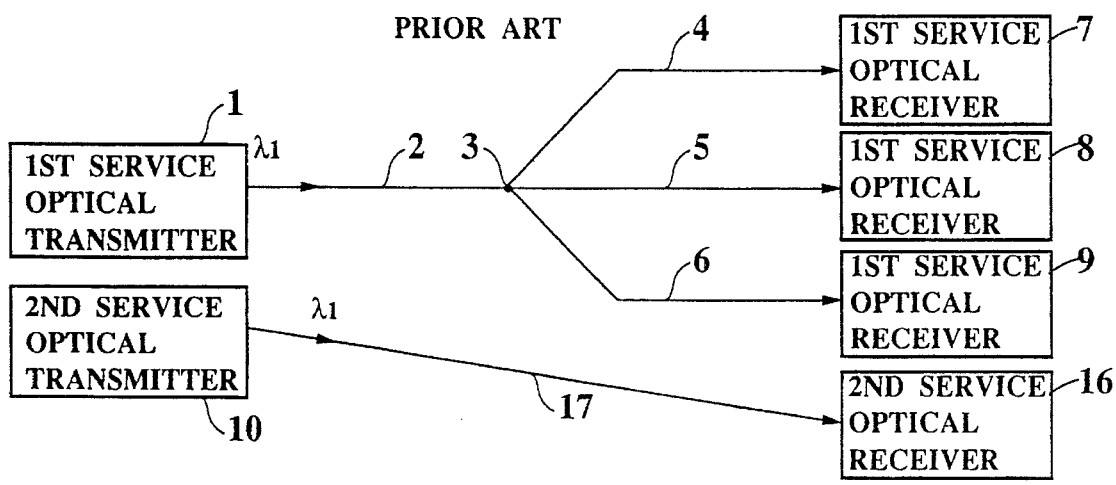
FIG. 1C is a schematic diagram of another conventionally known type of modification of the configuration of FIG. 1A in a case of incorporating an additional service.
Figure 2:
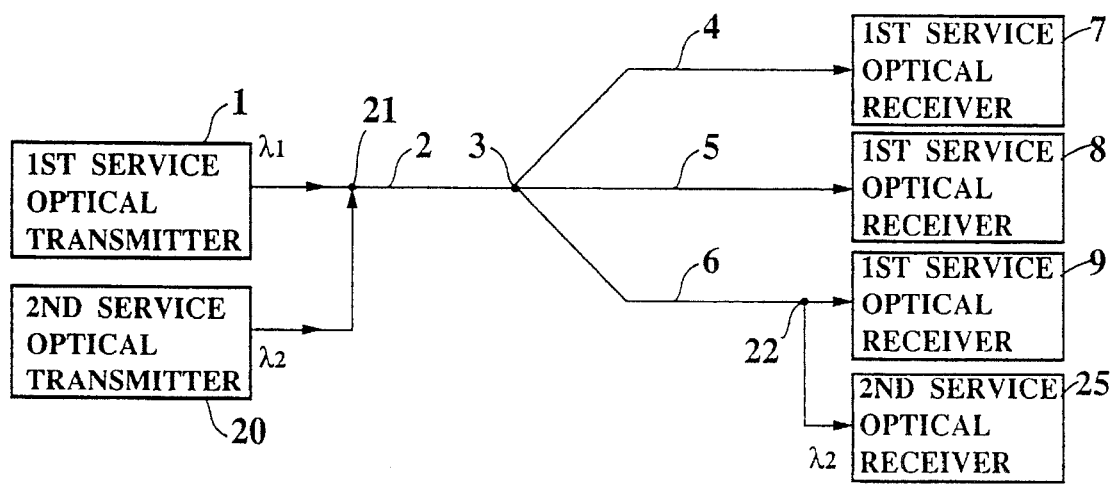
FIG. 2 is a schematic diagram of one embodiment of an optical communication system according to the present invention.

Referring now to FIG. 2, one embodiment of an optical communication system according to the present invention will be described in detail. This embodiment concerns with a case for providing two distinct services of a first service and a second service, to different numbers of the subscribers.

In this configuration of FIG. 2, a system station side has a first service optical transmitter 1 of an intensity modulation type which transmits the intensity modulated light signals containing the data of the first service with the wavelength of $\lambda 1$, through an optical fiber 2 to an 1-to-N optical star coupler 3.

In addition, the system station side also has a second service optical transmitter 20 of an angle modulation type such as a frequency modulation type or a phase modulation type which transmits the angle modulated light signals containing the data of the second service, with the wavelength of $\lambda 2$ different from the wavelength $\lambda 1$ of the light signals of the first service.

Here, the light signals of the first service transmitted from the first service optical transmitter 1 and the light signals of the second service transmitted from the second service optical transmitter 20 are multiplexed at an optical distributor 21 provided at an end of the optical fiber 2. The multiplexed light signals obtained at the optical distributor 21 are then transmitted through the optical fiber 2 and distributed by the optical star coupler 3 to the optical fibers 4, 5, and 6 connected to the subscriber terminals equipped with first service optical receivers 7, 8, and 9 of a direct detection type which are capable of demodulating the intensity modulated light signals of the first service with the wavelength $\lambda 1$.

In addition, the subscriber terminal of a subscriber who also subscribed to the second service in addition to the first service is also equipped with an optical distributor 22 attached on the optical fiber 6 in front of the first service optical receiver 9 for distributing the multiplexed light signals transmitted through the optical fiber 6 to the first service optical receiver 9 and a second service optical receiver 25 to be described below, without demultiplexing the light signals of the first service with the wavelength $\lambda 1$ and the light signals of the second service with the wavelength $\lambda 2$.

Furthermore, the subscriber terminal of a subscriber who also subscribed to the second service in addition to the first service is also equipped with a second service optical receiver 25 which is capable of demodulating the angle modulated light signals with the wavelength λ2, which receives the light signals of the second service from the multiplexed light signals distributed by the optical distributor 22. As will be described in detail, this second service optical receiver 25 is preferably a balanced receiver which is more preferably an optical heterodyne or homodyne receiver.

In this configuration of FIG. 2, it is not necessary to provide the optical wavelength division demultiplexers for demultiplexing the light signals of the first service with the wavelength λ1 and the light signals of the second service with the wavelength λ2 to any of the subscriber terminals, and it suffices to provide the optical distributor 22 to the subscriber terminals of those subscribers who also subscribed to the second service, for the following reasons.

Figure 3:
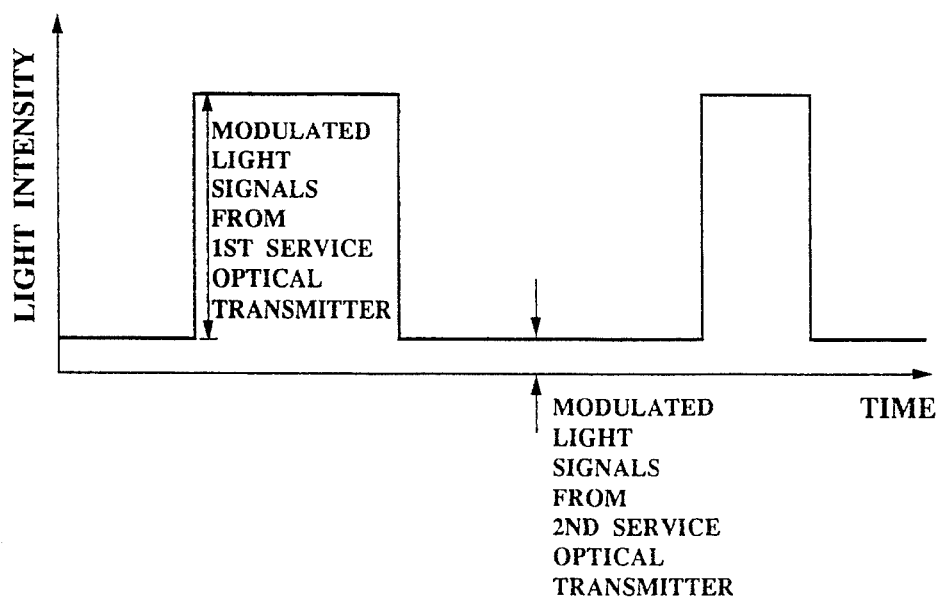
FIG. 3 is a graph of light intensity versus time for light signals used in the optical communication system of FIG. 2.

Namely, in this embodiment, the first service light signals has the light intensity substantially stronger than that of the second service light signals, so that the multiplexed light signals received by each of the first service optical receivers 7, 8, and 9 have the waveform as shown in FIG. 3. Here, it is to be noted that although this FIG. 3 shows a case of using digital signals, the principle to be described below is equally valid for a case of using analog signals.

In the waveform shown in FIG. 3, the multiplexed light signals can be represented as a sum of the first service light signal component and the second service light signal component as indicated in FIG. 3. In this case, the first service light signal component has a deteriorated extinction ratio due to the fact that the second service light signal components not intensity modulated but angle modulated. However, in this embodiment, the second service light signal component can be quite small compared with the first service light signal component because the second service optical receiver 25 is an optical heterodyne or homodyne receiver which has a very high sensitivity such that a sufficient reception can be achieved for a relatively weak received light intensity. Consequently, the deterioration of the extinction ratio for the first service light signal component can be limited to a very small extent such that the reception of the first service light signals by the first service optical receivers 7, 8, and 9 are hardly affected by this deterioration of the extinction ratio.

For this reason, those subscribers who do not subscribe to the second service can receive the first service without making any change in their subscriber terminals, by using the already existing optical fiber network as it is. As for those subscribers who also subscribed to the second service in addition to the first service, the second service light signals can be selectively received by the second service optical receiver 25 which has a very high light signal frequency selectivity partly due to a balanced nature of the second service optical receiver 25 and partly also due to the local gain obtainable by the second service optical receiver 25, while the first service optical receiver 9 receives the first service light signals just like the first service optical receivers 7 and 8 of those subscribers who do not subscribe to the second service.

More specifically, the S/N ratio in the multiplexed light signals received at the first service optical receivers 7, 8, and 9 can be expressed by the following equation (1).

$$\frac{S}{N} = \frac{1/2(mMI_S)^2}{2q(I_S+I_d+I_B)M^{2+x}B + 4kTB/R + 1/2(m'MI_B)^2} \quad (1)$$

where m is a modulation factor of the intensity modulated first service light signals, M is a multiplication factor of a photo-diode used in the first service optical receiver, $I_S$ is an average current in a state with no multiplication, $I_d$ is a dark current in a state with no multiplication, $I_B$ is an average current due to the angle modulated second service light signals in a state with no multiplication, x is an excess noise factor, B is a band of the first service optical receiver, k is the Boltzmann constant, T is the absolute temperature, R is a load resistance, and m' is a modulation factor of the intensity modulated component in the angle modulated second service light signals.

Here, when the pin photo-diode is used, the multiplication factor M takes the value of M=1. Also, the average current $I_S$ can be expressed as $I_S=\eta qP/h\nu$, where η is the quantum efficiency of the photo-diode, q is a charge of the electron, P is the input light power, h is the Planck constant, ν is the light frequency.

It is to be noted that the excessive noise factor x has a relatively large value such as x=0.8 to 1.0 for the Ge avalanche photo-diode, and x=0.7 for the InGaAs avalanche photo-diode, so that the reception sensitivity for the first service light signals will be deteriorated considerably when the avalanche photo-diode is used in the first service optical receiver for the purpose of receiving the multiplexed light signals containing the average current Is due to the angle modulated second service light signals. For this reason, it is preferable to use the pin photo-diode in the first service optical receiver in order to realize a better reception sensitivity for the first service light signals. Consequently, in the following description, the first service optical receiver is assumed to be using the pin photo-diode.

It is also to be noted that the modulation factor m' of the intensity modulated component in the angle modulated second service light signals is sufficiently small to be regarded as 1>> m', so that the sufficient reception of the second service light signals can be achieved even for the multiplexed light signals in which $I_B \ll I_S$ by the second service optical receiver which is an optical heterodyne or homodyne receiver.

Thus, the above equation (1) implies that, in this embodiment, the increase of the noise in the intensity modulated first service light signals is quite small even when the angle modulated second service light signals are multiplexed with the intensity modulated first service light signals.

As an example, a result of the calculation for a case of multiplexing the digital frequency modulated second service light signals with the analog intensity modulated first service light signals transmitting the 50 channel TV signals will be shown in FIG. 4 and FIG. 5.

FIG. 4 shows a power penalty on the intensity modulated first service light signals due to the shot noise caused by the angle modulated second service light signals with various light intensity $P_B$ in such a case, for three different values of the load resistances, whereas FIG. 5 shows a power penalty on the intensity modulated first service light signals due to the shot noise caused by the angle modulated second service light signals with various modulation factor m' of the intensity modulated component, for three different values of the load resistances.

Here, considering the fact that the sufficient reception of the second service light signals is achievable for the light intensity $P_B$ of about 1 to 0.01 μW per one channel, and that the modulation factor of the intensity modulated component in the angle modulated second service light signals is about 1%, it can be concluded from the result shown in these FIG. 4 and FIG. 5 that more than 10 channels of the second service light signals can be multiplexed with the first service light signals with the power penalty on the first service light signals less than 1 dB.

Figure 6:
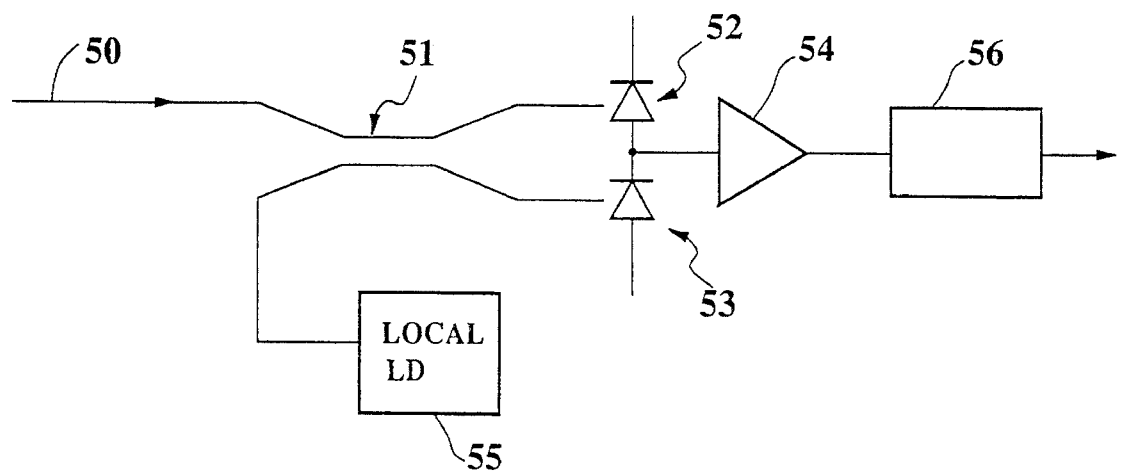
FIG. 6 is a schematic block diagram of a balanced optical heterodyne/homodyne receiver that can be used in the optical communication system of FIG. 2.
Figure 7:
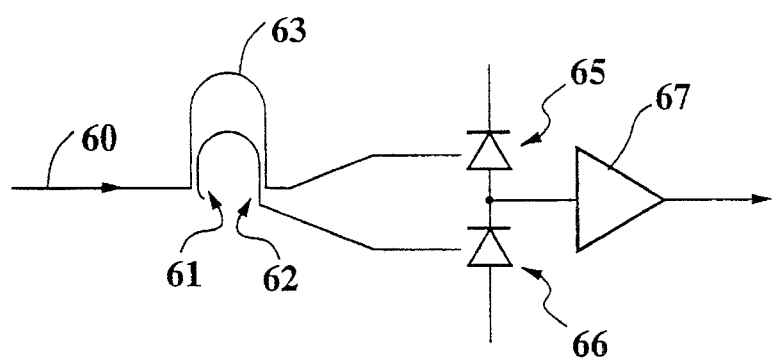
FIG. 7 is a schematic block diagram of an optical FSK demodulation type receiver that can also be used in the optical communication system of FIG. 2.
Figure 8:
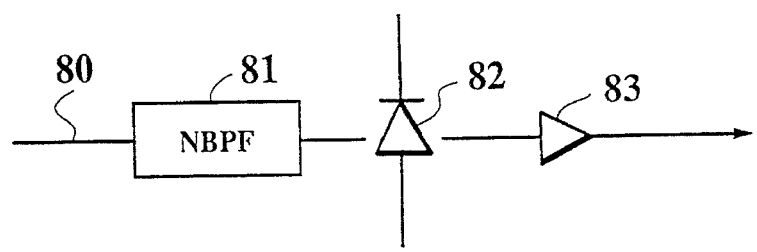
FIG. 8 is a schematic block diagram of another configuration of an optical receiver that can also be used in the optical communication system of FIG. 2.

Referring now to FIG. 6 to FIG. 8, exemplary configurations suitable for the second service optical receiver to be used in this embodiment will be described.

First, FIG. 6 shows a configuration of a balanced optical heterodyne or homodyne receiver suitable for the second service optical receiver.

In this configuration of FIG. 6, the entering light signals transmitted from an optical fiber 50 are multiplexed with locally generated light signals generated by a local laser diode (LD) 55 at an optical coupler 51. When the frequency of the locally generated light signals is equal to the frequency of the entering light signals, this receiver is the homodyne receiver, whereas otherwise this receiver is the heterodyne receiver.

The multiplexed light signals obtained by the optical coupler 51 are then distributed to two photo-diodes 52 and 53 connected in series with their polarities aligned with each other. Then, the electric signals obtained by the photoelectric conversion of the multiplexed light signals at the photo-diodes 52 and 53 are extracted from a series connection section between these two photo-diodes 52 and 53 such that the intensity modulated signal component can be cancelled out in the extracted electric signals.

As a result, the data transmitted by the intensity modulated first service light signals will not be detected in the extracted electric signals, and only the data transmitted by the angle modulated second service light signals will be detected. Here, the detected electric signals are obtained with a large local gain resulting from the interference between the angle modulated signal component due to the angle modulated second service light signals and the angle modulated signal component due to the locally generated light signals. The extracted electric signals obtained from the series connection section between these two photo-diodes 52 and 53 are then amplified by an amplifier 54 and the filtered by a band pass filter 56 in order to obtain reproducible electric signals representing the second service.

Next, FIG. 7 shows a configuration of an optical FSK (Frequency Shift Keying) demodulator circuit which is not an optical heterodyne or homodyne receiver but which can also be used for the second service optical receiver.

In this configuration of FIG. 7, the entering light signals transmitted from an optical fiber 60 are entered into a Mach-Zehnder interferometer configuration formed by optical fibers 63 and 64 of different path lengths provided in parallel between optical couplers 61 and 62, which makes the FM-AM conversion of the entered light signals.

The multiplexed light signals with the interference obtained by this Mach-Zehnder interferometer configuration are then distributed to two photo-diodes 65 and 66 connected in series with their polarities aligned with each other. Then, the electric signals obtained by the photoelectric conversion of the multiplexed light signals with the interference at the photo-diodes 65 and 66 are extracted from a series connection section between these two photo-diodes 65 and 66 such that the intensity modulated signal component can be cancelled out in the extracted electric signals.

As a result, the data transmitted by the intensity modulated first service light signals will not be detected in the extracted electric signals, and only the data transmitted by the angle modulated second service light signals will be detected, as in a case of FIG. 6 described above. The extracted electric signals obtained from the series connection section between these two photo-diodes 65 and 66 are then amplified by an amplifier 67 in order to obtain reproducible electric signals representing the second service.

Next, FIG. 8 shows a configuration which is neither a balanced receiver not an optical heterodyne or homodyne receiver but which can also be used for the second service optical receiver.

In this configuration of FIG. 8, the entering light signals transmitted from an optical fiber 80 are applied with the FM-AM conversion using a narrow band pass filter (NBPF) 81 first, and then the FM-AM converted light signals are applied with the photoelectric conversion using an avalanche photo-diode 82 next, to obtain the electric signals representing the second service. The obtained electric signals are then amplified by an amplifier 83 in order to obtain reproducible electric signals representing the second service. This configuration is capable of achieving a high reception sensitivity because of the multiplication effect of the avalanche photo-diode 82.

Here, it is to be noted that when the optical heterodyne receiver is used for the second service optical receiver, it becomes possible to make a clear separation between the first service light signals and the second service light signals by using a filter as follows.

Figure 9:
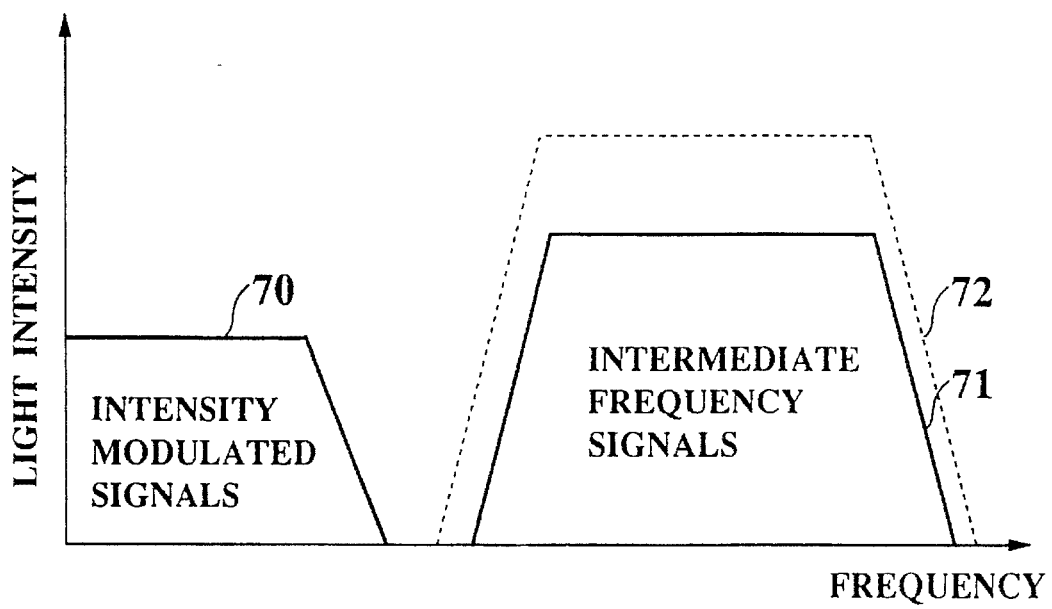
FIG. 9 is a graph of intensity versus central frequency for light signal output of an amplifier in the balanced heterodyne receiver having a configuration shown in FIG. 6.

The output of the amplifier 54 in the configuration of FIG. 6 has the frequency distribution for the intermediate frequency (IF) signal component as shown in FIG. 9. Consequently, by setting the intermediate frequency band of the intermediate frequency signal component 71 to be substantially higher than the baseband frequency band of the intensity modulated signal component 70 at the optical transmitter side, the intermediate frequency signal component 71 can be extracted in clear separation from the intensity modulated signal component 70 by using the band pass filter 56 having a filtering characteristic 72 for selectively extracting the intermediate frequency band of the intermediate frequency signal component 71 as indicated in FIG. 9, such that the intensity modulated signal component 70 at the lower frequency range can be suppressed effectively. Here, it is further effective to use the band restriction to limit the baseband frequency band of the intensity modulated signal component 70 to the lower frequency range as shown in FIG. 9, in addition to the above described separation using the band pass filter 56.

Referring now to FIG. 10 to FIG. 15, various applications of the above described embodiment of the optical communication system according to the present invention to optical communication network configurations will be described.

Figure 10:
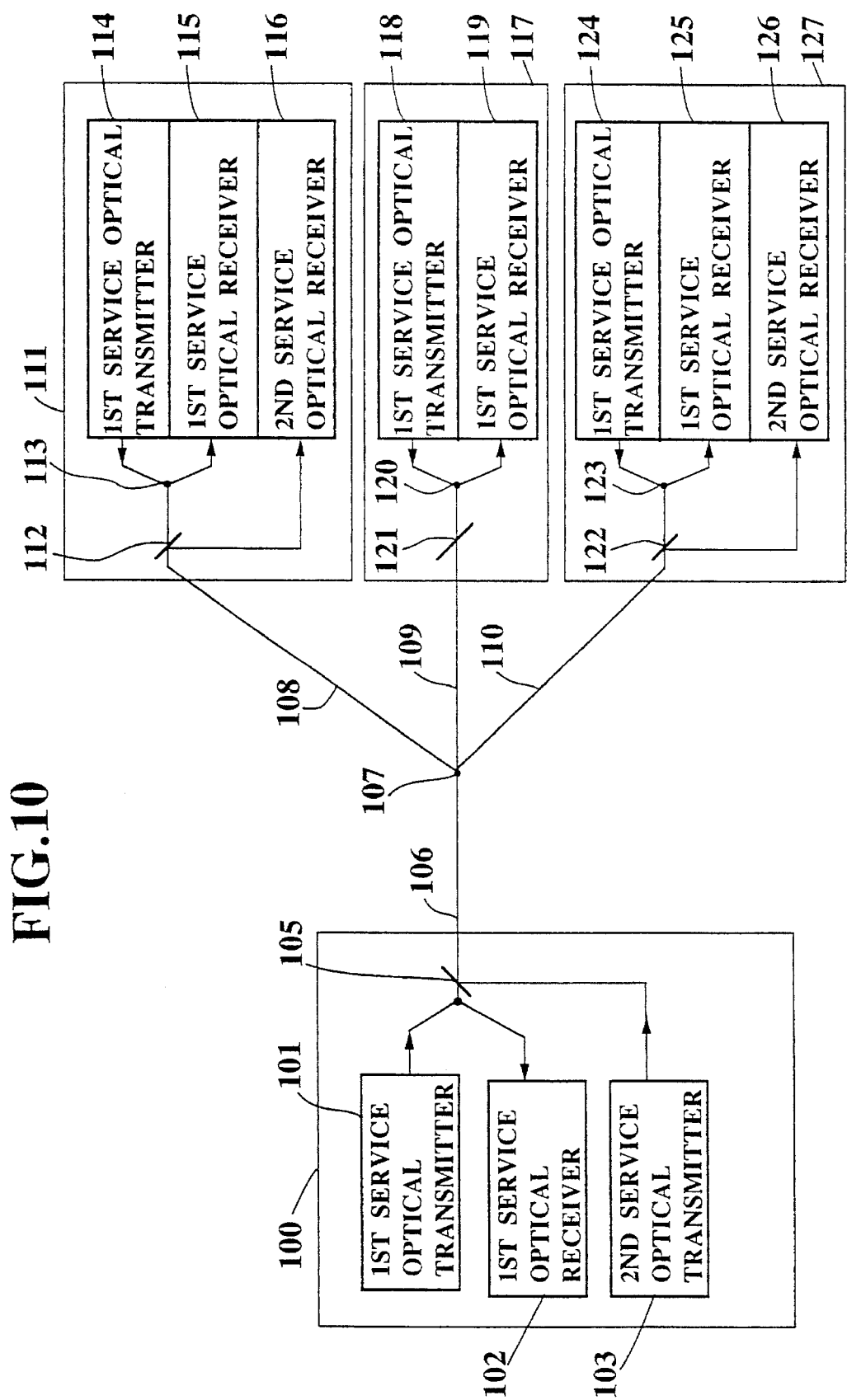
FIG. 10 is a schematic diagram of an exemplary communication network formed by using an optical communication system providing a plurality of services.

FIG. 10 shows an exemplary star shaped subscriber network system using TCM (Time Compression Multiplexing) and WDM (Wavelength Division Multiplexing) transmission modes, which is suitable for the application of the optical communication system according to the present invention.

This subscriber network system of FIG. 10 generally comprises a system station 100 and subscriber terminals 111, 117, and 127.

The system station 100 has a first service optical transmitter 101 of intensity modulation type and a first service optical receiver 102 of direct detection type for transmitting and receiving first service light signals in the TCM transmission mode with respect to each one of the subscriber terminals 111, 117, and 127. In addition, the system station 100 also has a second service optical transmitter 103 of intensity modulation type for transmitting second service light signals for a second service which is substantially different from the first service and to be provided to the selected number of the subscriber terminals.

The system station 100 is also equipped with an optical distributor 104 for selectively transmitting the first service light signals transmitted from the first service optical transmitter 101 and the first service light signals to be received by the first service optical receiver 102, and an optical wavelength division multiplexer and demultiplexer 105 for multiplexing the first service light signals transmitted from the first service optical transmitter 101 through the optical distribute 104 and the second service light signals transmitted from the second service optical transmitter 103 into the multiplexed first and second service light signals to be transmitted through an optical fiber 106. Here, the first service optical transmitter 101 and the second service optical transmitter 108 transmits the first service and second service light signals with widely different wavelengths, so as to realize the WDM transmission mode at the optical wavelength division multiplexer and demultiplexer 105.

The multiplexed first and second light signals transmitted through the optical fiber 106 are distributed by an 1-to-N optical star coupler 107 into optical fibers 108, 109, and 110 connected to the subscriber terminals 111, 117, and 127, respectively.

The subscriber terminals 111, 117, and 127 are equipped with: first service optical transmitters 114, 118, and 124, respectively, of intensity modulation type for transmitting the first service light signals in the TCM transmission mode to the system station 100; first service optical receivers 115, 119, and 125, respectively, of a direct detection type for receiving the first service light signals in the TCM transmission mode from the system station 100; and optical distributors 113, 120, and 123, respectively, for selectively transmitting the first service light signals transmitted from the first service optical transmitters 114, 118, and 124 and the first service light signals to be received by the first service optical receivers 115, 119, and 125, respectively.

In addition, the subscriber terminals 111 and 127 are also equipped with second service optical receivers 116 and 126, respectively, of a direct detection type for receiving the second service light signals from the system station 100. Furthermore, the subscriber terminals 111, 117, and 127 are also equipped with optical wavelength division multiplexer and demultiplexers 112, 121, and 122, respectively, for demultiplexing the first service light signals and the second service light signals from the multiplexed first and second service light signals transmitted through the optical fibers 108, 109, and 110, respectively.

Thus, in this configuration of FIG. 10, two different services of the first service and the second service are provided by utilizing the wavelength multiplexing transmission mode, without utilizing the optical communication system according to the present invention.

Now, in order to further provide a third service different from both of the first and second services by utilizing the optical communication system according to the present invention, this configuration of FIG. 10 can be modified to a configuration shown in FIG. 11 as follows.

Figure 11:
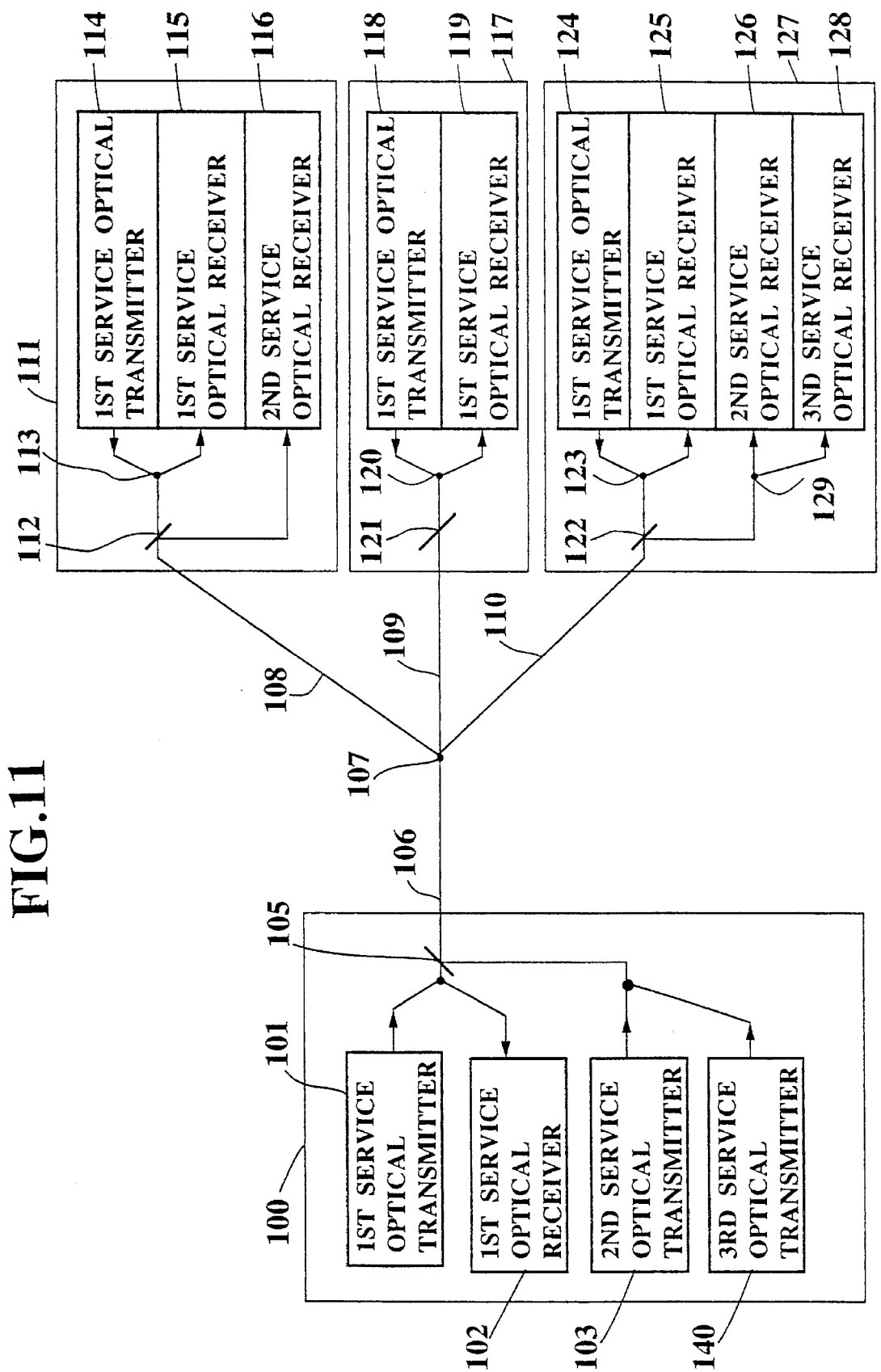
FIG. 11 is a schematic diagram of a first example of a communication network formed by using the optical communication system of FIG. 2, incorporating three services.

Namely, in this configuration of FIG. 11, third service light signals for the third service are provided with a wavelength in a vicinity of the wavelength used for the second service light signals.

In this case, the system station 100 is further equipped with a third service optical transmitter 140 of the angle modulation type for transmitting the third service light signals to only the selected number of the subscriber terminals, and an optical distributor 130 for multiplexing the third service light signals from the third service optical transmitter 140 with the second service light signals from the second service optical transmitter 103 and supplying the multiplexed second and third service light signals to the optical wavelength division multiplexer and demultiplexer 105.

On the other hand, the subscriber terminal 127 is also equipped with a third service optical receiver 128 for receiving the third service light signals, and an optical distributor 129 for distributing the multiplexed light signals of the second service light signals and the third service light signals transmitted through the optical fiber 110 and demultiplexed from the first service light signals by the optical wavelength division multiplexer and demultiplexer 122.

Thus, in this configuration of FIG. 11, it is not necessary to provide the optical wavelength division demultiplexers for demultiplexing the second and third light signals to any of the subscriber terminals, and it suffices to provide the optical distributor 129 to the subscriber terminals of those subscribers who also subscribed to the third service, for the reasons already described in conjunction with the above described embodiment.

In addition, in order to further provide a still another fourth service different from the first, second and third services by utilizing the optical communication system according to the present invention, this configuration of FIG. 11 can be further modified to a configuration shown in FIG. 12 as follows.

Figure 12:
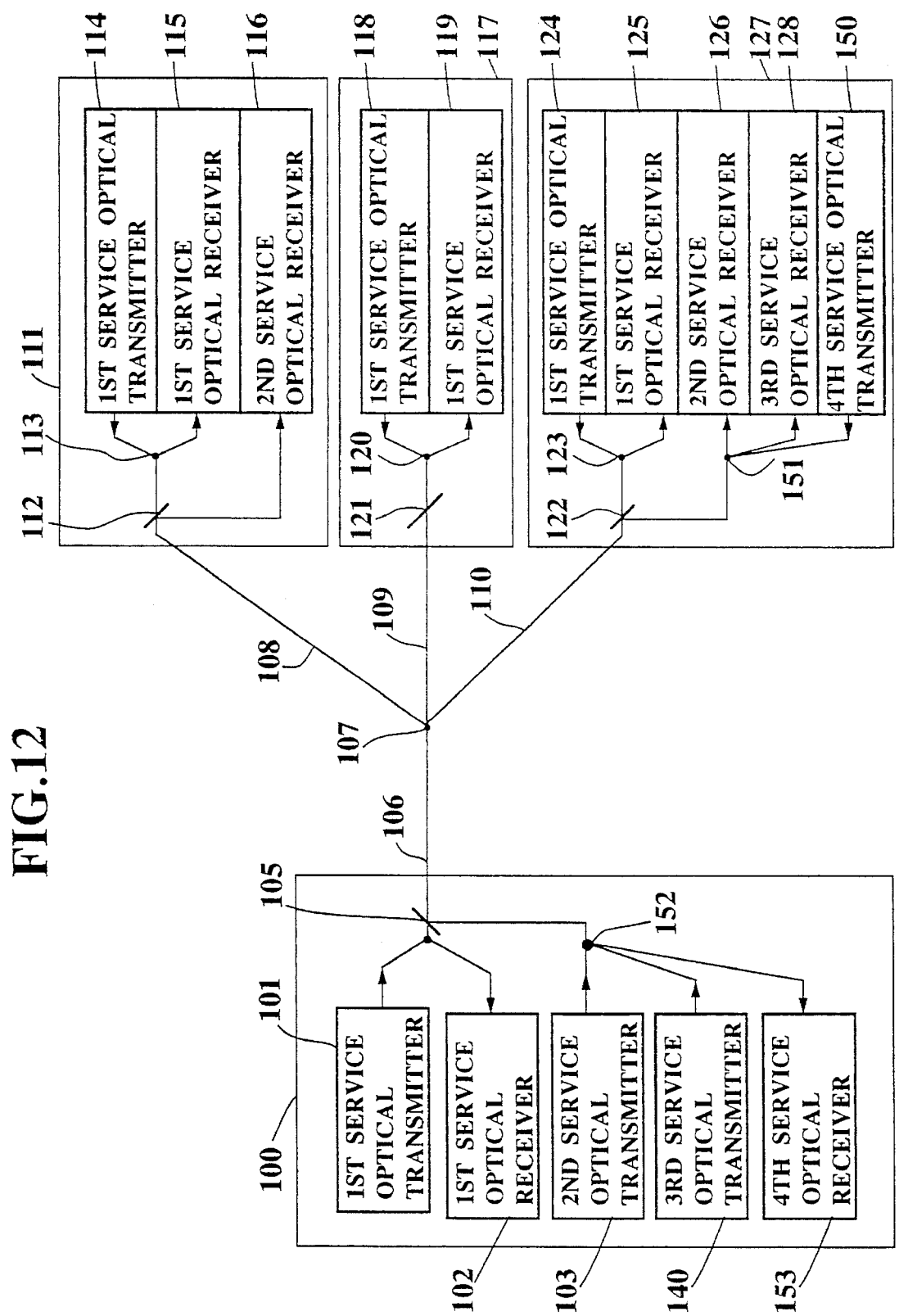
FIG. 12 is a schematic diagram of a second example of a communication network formed by using the optical communication system of FIG. 2, incorporating four services.

In this configuration of FIG. 12, the system station 100 is further equipped with a fourth service optical receiver 153 for receiving the fourth service light signals from only the selected number of the subscriber terminals, and the optical distributor 130 is replaced by an 1-to-3 optical distributor 152 for multiplexing the third service light signals from the third service optical transmitter 140 with the second service light signals from the second service optical transmitter 103 and selectively transmitting the multiplexed second and third service light signals to the optical wavelength division multiplexer and demultiplexer 105 and the fourth service light signals to be received by the fourth service optical receiver 153.

On the other hand, the subscriber terminal 127 is also equipped with a fourth service optical transmitter 150 for transmitting the fourth service light signals, and the optical distributor 129 is replaced by an 1-to-3 optical distributor 151 for selectively transmitting the fourth service light signals transmitted from the fourth service optical transmitter 150 to the optical wavelength division multiplexer and demultiplexer 122 and distributing the second service light signals and the third service light signals transmitted through the optical fiber 110 and demultiplexed from the first service light signals by the optical wavelength division multiplexer and demultiplexer 122.

Figure 13:
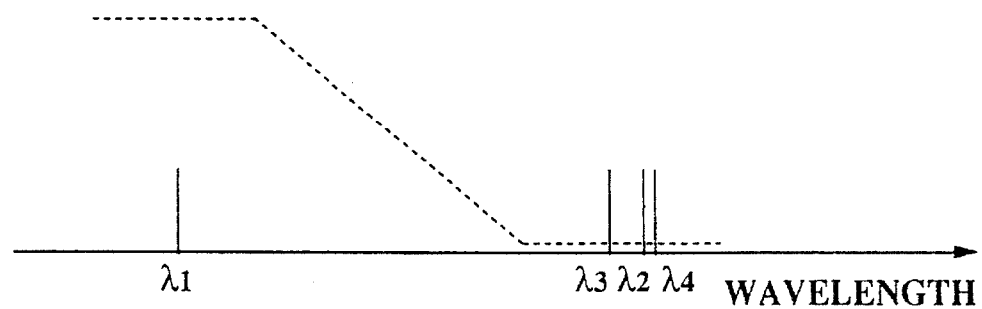
FIG. 13 is a graph of wavelengths of light signals for four services incorporated in .the communication network of FIG. 12.

In this configuration of FIG. 12, fourth service light signals for the fourth service are provided with a wavelength in a vicinity of the wavelength used for the second and third service light signals, as shown in FIG. 13. Namely, as shown in FIG. 13, the wavelength $\lambda 1$ of the first service light signals are significantly separated from the wavelengths $\lambda 2$, $\lambda 3$, and $\lambda 4$ of the second, third, and fourth service light signals, respectively, which are set to be relatively close to each other. In FIG. 13, the dashed line indicates the transmission characteristic of the optical wavelength division multiplexer and demultiplexers 105, 112, 121, and 122 which shows that the optical wavelength division multiplexer and demultiplexers 105, 112, 121, and 122 can transmit only the wavelength λ1 of the first service light signals.

Such a fourth service is useful in a case of incorporating the service for receiving a large amount of data from the subscriber to the system station.

As in this configuration of FIG. 12, by utilizing the optical communication system according to the present invention, any number of additional services can be added to the already existing service network, without imposing the very inconvenient requirement of the change of the subscriber terminal equipment to those subscribers who do not subscribe to the additional services, or the highly ineconomical requirement of the installment of a completely new optical fiber network dedicated to each one of the additional services.

Here, it is to be noted that the insertion loss at the optical distributors 151 and 152 used in the configuration of FIG. 12 increases as the number of distribution routes increases in correspondence to the number of the additional services to be added. However, because the optical heterodyne/homodyne receiver to be used for the optical receiver of the additional service has a very high reception sensitivity, so that the distribution rates among a plurality of distribution rates may be set up unevenly to provide a relatively large light intensity for the direct detection type optical receiver of the service using the intensity modulation compared with the optical receivers of the services using the angle modulation.

Here, it is also to be noted that the advance communication through the first and second services may be utilized for the purpose of avoiding the collision of the data transmissions for the third and fourth services.

Figure 14:
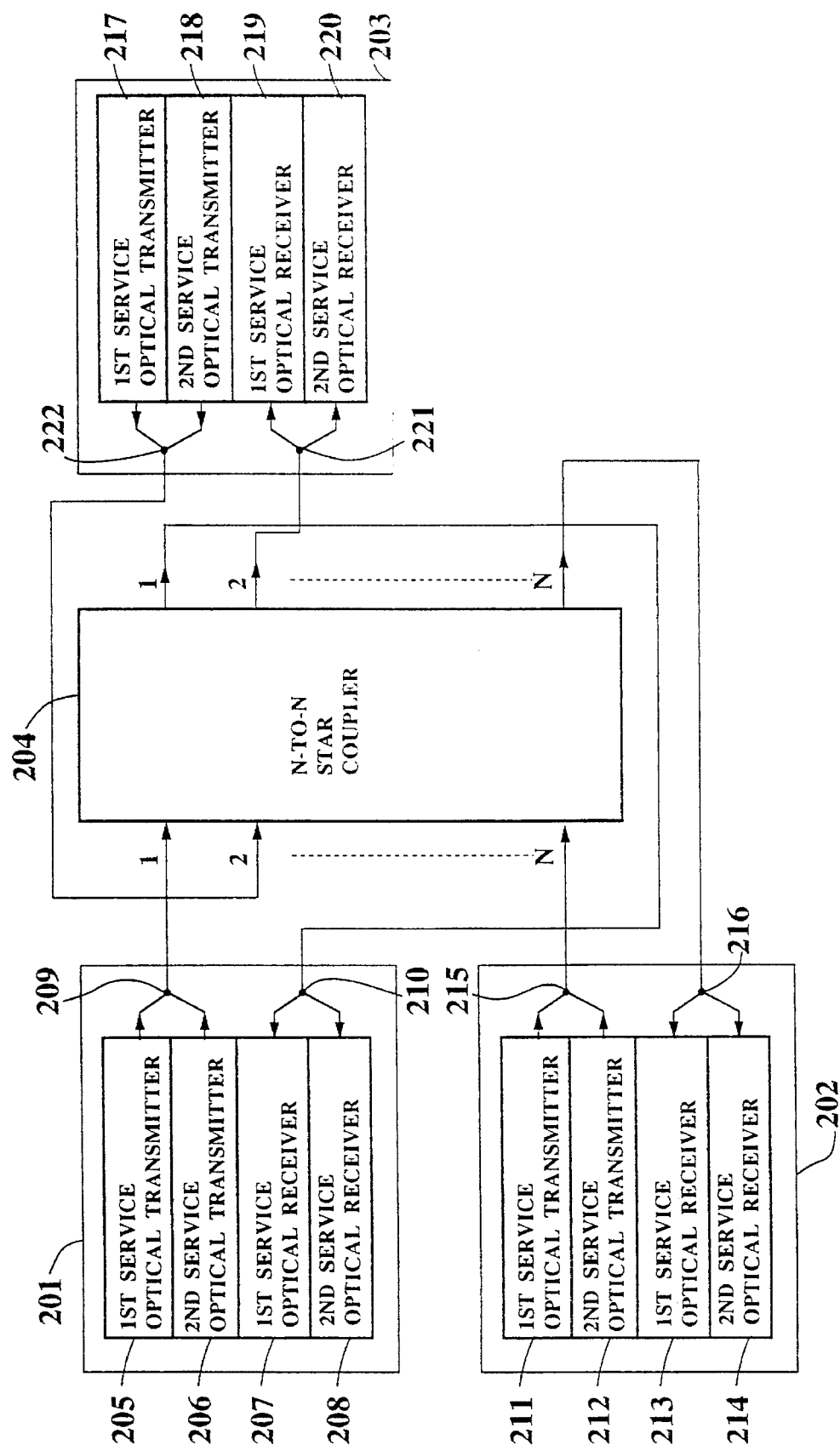
FIG. 14 is a schematic diagram of a third example of a communication network formed by using the optical communication system of FIG. 2, in a form of a star network.

Next, FIG. 14 shows an exemplary N-to-N star shaped communication network system using the optical communication system according to the present invention.

This communication network system of FIG. 14 generally comprises a plurality of communication stations 201, 202, and 203, which are interconnected by an N-to-N optical star coupler 204 through optical fibers. The communication stations 201, 202, and 203 are equipped with first service optical transmitter 205, 211, and 217, respectively, of intensity modulation type and first service optical receivers 207, 213, and 219, respectively, of direct detection type for transmitting and receiving first service light signals for a first service with respect to the other communication stations. In addition, the communication stations 201, 202, and 203 are equipped with second service optical transmitters 206, 212, and 218, respectively, of angle modulation type and second service optical receivers 208, 214, and 220, respectively, for transmitting and receiving second service light signals for a second service which is substantially different from the first service with respect to the other communication stations. The communication stations 201, 202, and 203 are also equipped with optical distributors 209, 215, and 222, respectively, for multiplexing the first service light signals transmitted from the first service optical transmitters 205, 211, and 217, respectively, and the second service light signals transmitted from the second service optical transmitters 206, 212, and 218, respectively, to obtain the multiplexed light signals to be transmitted through the N-to-N optical star coupler 204, and optical distributors 210, 216, and 221, respectively for distributing the multiplexed light signals multiplexing the first service light signals to be received by the first service optical receivers 207, 213, and 219, respectively, and the second service light signals to be received by the second service optical receivers 208, 214, and 220, respectively.

In this communication network of FIG. 14, the first service is used as a primary communication channel supporting the communication protocol such as CSMA/CD (Carrier Sense Multiple Access with Collision Detection) or implicit token protocols, while the second service is used as a secondary communication channel for the transmission of a large amount off data.

Here, this communication network can deal with a very large amount of data by setting the transmission wavelengths to be used by the second service optical transmitters 206, 212, and 218 of the communication stations 201, 202, and 203 to be different from each other and the reception off the second service light signals from one communication station at another communication station is achieve by tuning to the desired transmission wavelength of the second service light signals of that one communication station at that another communication station.

Here, it is also to be noted that the advance communication through the first service may be utilized for the purpose of avoiding the collision of the data transmissions for the second service, by exchanging the request for the data transmission and the permission of the requested data transmission in advance through the first service between the communication stations to make the data transmission in the second service.

It is also robe noted that when the wavelengths used in the first and second services differs considerably, such as 1.3 μm and 1.55 μm for example, so that the insertion loss of the optical distributors 209, 210, 215, 216, 222, and 221 gives rise to the limitation on a maximum number of communication stations in the communication network or a maximum transmission distance, an optical wavelength division multiplexer and demultiplexer may be used instead of each optical distributor. In this case, as the problem of the cross talk is virtually non-existent because of the difference of the modulation types of the first and second services, the optical wavelength division multiplexer and demultiplexer of distributed coupling type such as a fused fiber type optical wavelength division multiplexer and demultiplexer can be utilized. Here, there is no need to provide a wavelength filter in conjunction with such an optical wavelength division multiplexer and demultiplexer of distributed coupling type, in contrast to a usual wavelength division multiplexing network in which the use of the wavelength filter in conjunction with the optical wavelength division multiplexer and demultiplexer of distributed coupling type is absolutely necessary because of the large cross talk in the optical wavelength division multiplexer and demultiplexer of distributed coupling type.

Figure 15:
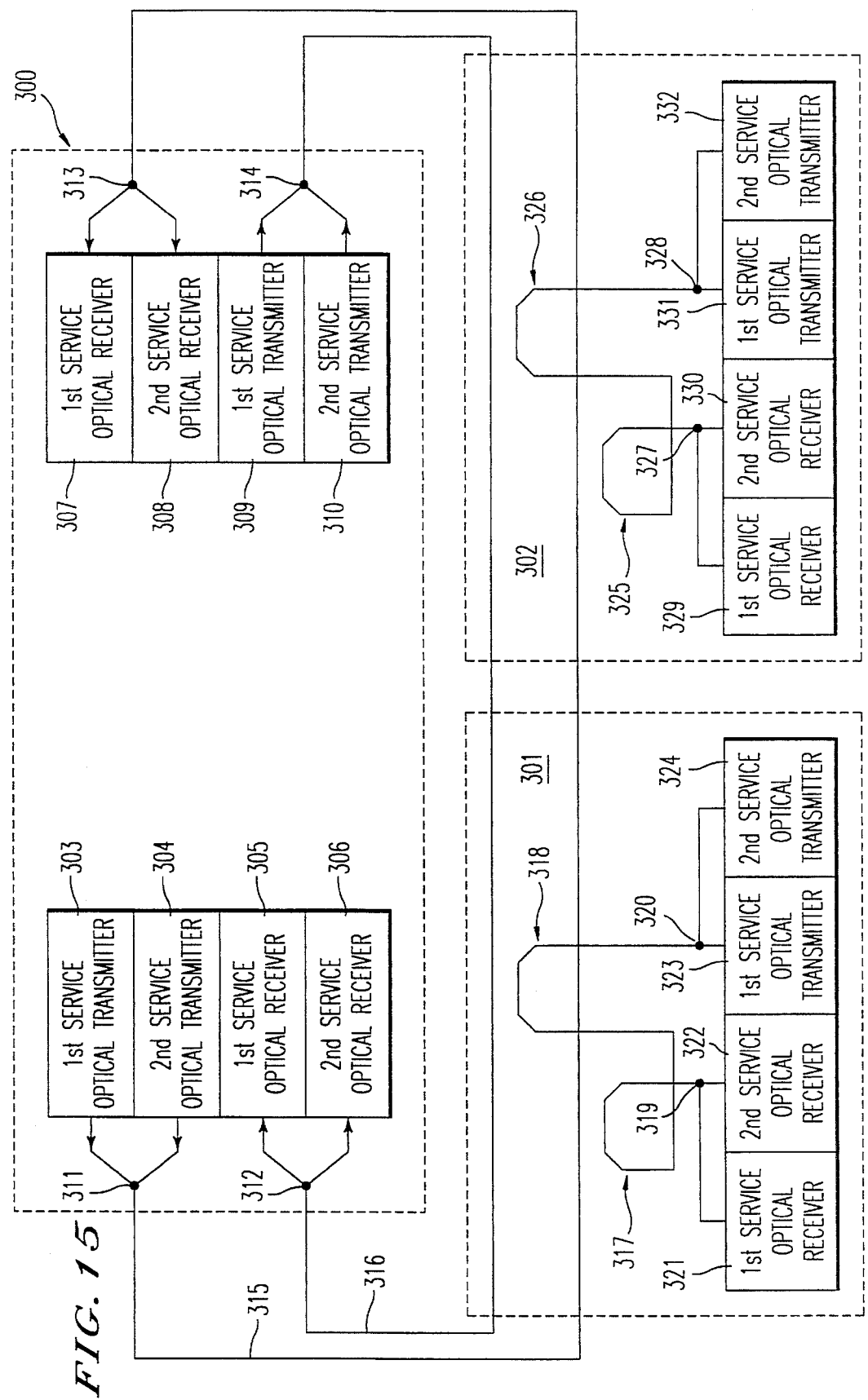
FIG. 15 is a schematic diagram of a fourth example of a communication network formed by using the optical communication system of FIG. 2, in a form of a loop network.

Next, FIG. 15 shows an exemplary 1-to-N loop shaped communication network system using the optical communication system according to the present invention.

This communication network system of FIG. 15 generally comprises a system station 300 and a plurality of subscriber stations 301 and 302, which are interconnected through loop shaped optical fiber lines 315 and 316. In normal state, the communication is made through the optical fiber line 315, and the optical fiber line 316 is reserved for a case of the disconnection of the optical fiber line 315. In a case of the disconnection of both of the optical fiber lines 315 and 316, the communication can be made by the so called loop back type operation through the still connected portion of the optical fiber lines 315 and 316.

The system station 300 has the first service optical transmitters 303 and 309 of the intensity modulation type for transmitting the intensity modulated first service light signals with the wavelength λ1 and the second service optical transmitters 304 and 310 of the angle modulation type for transmitting the angle modulated second service light signals with the wavelength λn in a vicinity of the wavelength λ1. Normally, the first service optical transmitter 303 and the second service optical transmitter 304 are operated to transmit the first and second service light signals which are multiplexed at an optical distributor 311 and then transmitted through the optical fiber line 315. In a case of the disconnection of the optical fiber line 315, the first and second service light signals transmitted from the first service optical transmitter 309 and the second service optical transmitter 310 are multiplexed at an optical distributor 314 and then transmitted through the optical fiber line 316.

The subscriber stations 301 and 302 have directional couplers 317 and 325, respectively, provided on the optical fiber line 315 and another directional couplers 325 and 326, respectively, provided on the optical fiber line 316, all for inputting and outputting the light signals with respect to the respective optical fiber lines 315 and 316. These directional couplers 317, 318, 325, and 326 have a relatively small total coupling rate of about 10%, and a little transmission loss.

The subscriber stations 301 and 302 also have first service optical receivers 321 and 329, respectively, which are equipped with built-in wavelength filters (not shown) capable of receiving the light signals with the wavelengths λ1 and λn such that the first service optical receivers 321 and 329 can receive the first service light signals transmitted from the system station 300.

The subscriber stations 301 and 302 also have second service optical receivers 322 and 330, respectively, which can receive the second service light signals transmitted from the system station 300.

The subscriber stations 301 and 302 also have first service optical transmitters 323 and 331, respectively, which can transmit the intensity modulated first service light signals with the wavelength λ2 that cannot be transmitted through the built-in wavelength filters of the first service optical receivers 321 and 329 of the subscriber stations 301 and 302.

The subscriber stations 301 and 302 also have second service optical transmitters 324 and 332, respectively, which can transmit the angle modulated second service light signals with the wavelength λm in a vicinity of the wavelength λ2.

The subscriber stations 301 and 302 also have optical distributors 319 and 327, respectively, for distributing the multiplexed light signals transmitted through the optical fiber lines 315 and 316, and optical distributors 320 and 328, respectively, for multiplexing the first and second service light signals transmitted from the first and second service optical transmitters 323 and 324, and 331 and 332, respectively.

The system station 300 also has first service optical receivers 305 and 307 for receiving the intensity modulated first service light signals with the wavelength λ2 transmitted from the subscriber stations 301 and 302 through an optical distributor 312, and second service optical receivers 306 and 308 for receiving the angle modulated second service light signals with the wavelength λm transmitted from the subscriber stations 301 and 302 through an optical distributor 313.

In this communication network of FIG. 15, the first service is used as a primary communication channel in the TDMA (Time Division Multiple Access) mode, while the second service is used as a secondary communication channel for the transmission of a large amount of data.

Here, it is also to be noted that the advance communication through the first service may be utilized for the purpose of avoiding the collision of the data transmissions for the second service.

Now, it is to be noted that, in the optical communication system according to the present invention, the angle modulated light signals has a high coherency so that the low frequency range noise may be caused by the multiple reflections of the angle modulated light signals between a plurality of the light reflective points on the light signal transmission path or the light transmission and reception terminals. Such a low frequency range noise due to the multiple reflection of the angle modulated light signals will be introduced into the intensity modulated light signals as the noise when they are multiplexed as they are. Such a noise in the intensity modulated light signals due to the multiple reflection of the angle modulated light signals can be suppressed by inserting an optical isolator in the light signal transmission path or by attaching reflectionless terminal closing members to the unconnected terminals.

Figure 16:
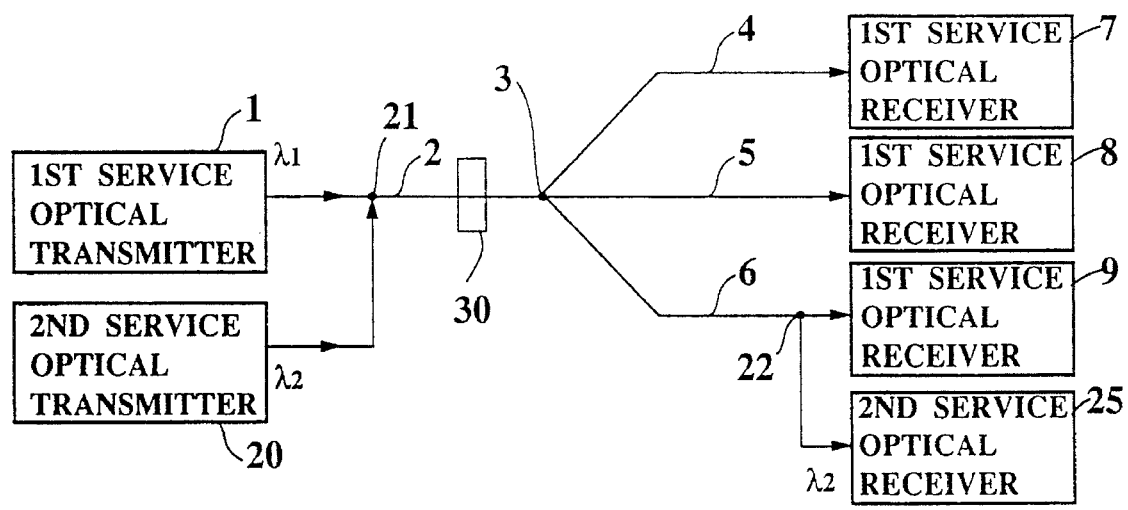
FIG. 16 is a schematic diagram of the optical communication system of FIG. 2, additionally incorporating an optical isolator.

For example, as shown in FIG. 16, the optical communication system of FIG. 2 can incorporate an optical isolator 30 between the optical distributor 21 and the optical star coupler 3 in a case of the multiple reflections on the optical fiber 2.

Figure 17:
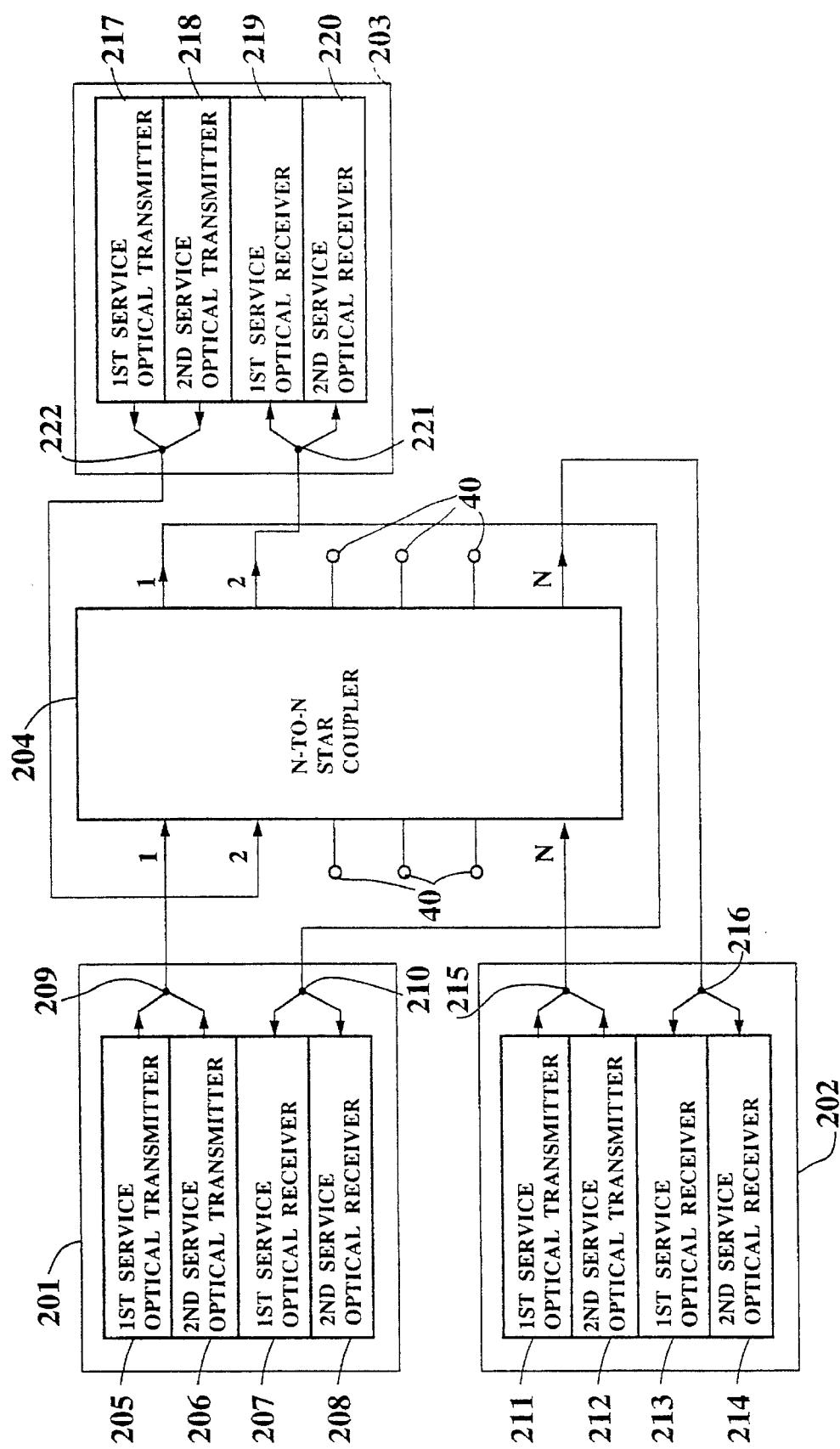
FIG. 17 is a schematic diagram of a communication network of FIG. 14, additionally incorporating reflectionless terminal closing members.

On the other hand, as shown in FIG. 17, the communication network system of FIG. 14 can incorporate reflectionless terminal closing members 40 attached on unconnected terminals of the N-to-N optical star coupler 204 in a case of the multiple reflections between the unconnected terminals of the N-to-N optical star coupler 204.

Besides these, many modifications and variations of the above embodiments may be made without departing from the novel and advantageous features of the present invention. Accordingly, all such modifications and variations are intended to be included within the scope of the appended claims.

What is claimed is:

1. An optical communication system, comprising:

optical fiber communication lines;

first optical transmitter means of an intensity modulation type for transmitting intensity modulated light signals with a first wavelength through the optical fiber communication lines;

second optical transmitter means of an angle modulation type for transmitting angle modulated light signals with a second wavelength through the optical fiber communication lines in a form of multiplexed light signals multiplexing the intensity modulated light signals and the angle modulated light signals;

first optical receiver means of a direct detection type for receiving the multiplexed light signals through the optical fiber communication lines and demodulating the intensity modulated light signals from the multiplexed light signals; and second optical receiver means for receiving and demodulating the angle modulated light signals from the multiplexed light signals transmitted through the optical fiber communication lines, the second optical receiver means being a balanced optical receiver for receiving the angle modulated light signals by cancelling out an intensity modulated light signal component in the multiplexed light signals.

2. The optical communication system of claim 1, wherein the angle modulated light signals are modulated by any one of a phase modulation and a frequency modulation.

3. The optical communication system of claim 1, further comprising:

means for multiplexing the intensity modulated light signals and the angle modulated light signals transmitted from the first optical transmitter means and the second optical transmitter means to obtain the multiplexed light signals to be transmitted through the optical fiber communication lines; and means for distributing the multiplexed light signals, comprised of the intensity modulated light signals with the first wavelength multiplexed with the angle modulated signals with the second wavelength, transmitted through the optical fiber communication lines both to the first optical receiver means and to the second optical receiver means.

4. The optical communication system of claim 1, wherein the first optical receiver means has a pin photo-diode for receiving the multiplexed light signals.

5. The optical communication system of claim 1, further comprising:

distributed coupling type optical wavelength division multiplexer means without a wavelength filter, for multiplexing the intensity modulated light signals with the first wavelength and the angle modulated light signals with the second wavelength, to obtain the multiplexed light signals to be transmitted through the optical fiber communication lines; and distributed coupling type optical wavelenth division demultiplexer means without a wavelength filter, for demultiplexing the intensity modulated light signals with the first wavelength and the angle modulated light signals with the second wavelength from the multiplexed light signals transmitted through the optical fiber communication lines.

6. The optical communication system of claim 1, wherein the second optical receiver means is formed by an optical heterodyne/homodyne receiver which further comprises:

means for generating local light signals;

means for multiplexing the multiplexed light signals transmitted through the optical fiber communication lines with the local light signals;

means for distributing the light signals obtained by the means for multiplexing into two photo-diodes, connected in series with a polarity aligned, for applying a photoelectric conversion on the light signals; and means for extracting electric signals from a series connection section between said two photo-diodes.

7. The optical communication system of claim 6, wherein the second optical transmitter means transmits the angle modulated light signals with an intermediate frequency band set to be substantially higher than a baseband frequency band of the intensity modulated light signals transmitted by the first optical transmitter means, and the second optical receiver means comprises an optical heterodyne receiver equipped with a band pass filter for selectively extracting the the intermediate frequency band.

8. The optical communication system of claim 7, wherein the first optical transmitter means transmits the intensity modulated light signals with the baseband frequency band restricted to be substantially below the intermediate frequency band of the angle modulated light signals transmitted by the second optical transmitter means.

9. The optical communication system of claim 1, wherein the second optical receiver means comprises an optical frequency shift keying demodulator circuit including a Mach-Zehnder interferometer configuration.

10. The optical communication system of claim 1, wherein the second optical receiver means comprises:

a narrow band pass filter for carrying out an FM-AM conversion of the multiplexed light signals; and an avalanche photo-diode for carrying out a photoelectric conversion of FM-AM converted multiplexed light signals obtained by the narrow Band pass filter.

11. The optical communication system of claim 1, wherein the optical fiber communication lines are equipped with optical isolator means for reducing noises due to multiple reflections in the optical fiber communication lines.

12. The optical communication system of claim 1, wherein the optical fiber communication lines include an optical coupler means for distributing the multiplexed light signals transmitted through one of the optical fiber communication lines into other ones of the optical fiber communication lines, where the optical coupler means has unconnected terminals equipped with reflectionless terminal closing members.

13. The optical communication system of claim 1, further comprising:

additional optical transmitter means of an intensity modulation type for transmitting another intensity modulated light signals with a third wavelength through the optical fiber communication lines, where the third wavelength is substantially separated from the first wavelength;

optical wavelength division multiplexer means for multiplexing said another intensity modulated light signals transmitted from the additional optical transmitter means with the intensity modulated light signals transmitted from the first optical transmitter means and the angle modulated light signals transmitted from the second optical transmitter means, to obtain the multiplexed light signals to be transmitted through the optical fiber communication lines; and optical wavelength division demultiplexer means for demultiplexing said another intensity modulated light signals with the third wavelength from the intensity modulated light signals with the first wavelength and the angle modulated light signals with the second wavelength in the multiplexed light signals transmitted through the optical fiber communication lines; and additional optical receiver means of a direct detection type for receiving and demodulating said another intensity modulated light signals demultiplexed by the optical wavelength division demultiplexer means.

14. The optical communication system of claim 1, further comprising:

additional optical transmitter means of an angle modulation type for transmitting another angle light signals with a third wavelength through the optical fiber communication lines in a form of multiplexed light signals multiplexing said another angle modulated light signals with the intensity modulated light signals and the angle modulated light signals, where the third wavelength is substantially separated from the second wavelength; and additional optical receiver means for receiving and demodulating said another angle modulated light signals from the multiplexed light signals transmitted through the optical fiber communication lines.

15. The optical communication system of claim 1, wherein the optical fiber communication lines are equipped with an optical star coupler means for distributing the multiplexed light signals transmitted from one of communication stations containing at least one of the first and second optical transmitter means and the first and second optical receiver means to other ones of said communication stations.

16. The optical communication system of claim 1, wherein the optical fiber communication lines comprises a loop shaped communication network for connecting communication stations containing at least one of the first and second optical transmitter means and the first and second optical receiver means through optical directional couplers.

17. The optical communication system of claim 1, wherein a communication by the intensity modulated light signals between the first optical transmitter and receiver means is utilized for setting up a condition for a communication by the angle modulated light signals between the second optical transmitter and receiver means.

18. An optical communication method, comprising the steps of:

transmitting intensity modulated light signals with a first wavelength through optical fiber communication lines;

transmitting angle modulated light signals with a second wavelength through the optical fiber communication lines in a form of multiplexed light signals multiplexing the angle modulated light signals and the intensity modulated light signals;

receiving the multiplexed light signals transmitted through the optical fiber communication lines and demodulating the intensity modulated light signals from the multiplexed light signals by using a direct detection; and receiving and demodulating the angle modulated light signals from the multiplexed light signals transmitted through the optical fiber communication lines by a balanced optical receiver for receiving the angle modulated light signals by cancelling out an intensity modulated light signal component in the multiplexed light signals.

19. The optical communication method of claim 18, further comprising the steps of:

multiplexing the intensity modulated light signals and the angle modulated light signals to obtain the multiplexed light signals to be transmitted through the optical fiber communication lines; and distributing the multiplexed light signals, comprised of the intensity modulated light signals with the first wavelength multiplexed with the angle modulated signals with the second wavelengths, transmitted through the optical fiber communication lines both to perform receiving and demodulating of the intensity modulated light signals from the multiplexed light signals by direct detection and to perform receiving and demodulated in the angle modulated light signals from the multiplexed light signals by cancelling out the intensity modulated light signal component by the balanced optical receiver.

* * * * *